US008959641B2

(12) United States Patent
Hirvonen

(10) Patent No.: US 8,959,641 B2
(45) Date of Patent: Feb. 17, 2015

(54) FOILING A DOCUMENT EXPLOIT ATTACK

(71) Applicant: F-Secure Corporation, Helsinki (FI)

(72) Inventor: Timo Hirvonen, Espoo (FI)

(73) Assignee: F-Secure Corporation, Helsinki (FI)

( * ) Notice: Subject to any disclaimer, the term of this patent is extended or adjusted under 35 U.S.C. 154(b) by 0 days.

(21) Appl. No.: 13/894,471

(22) Filed: May 15, 2013

(65) Prior Publication Data

US 2013/0312093 A1 Nov. 21, 2013

(51) Int. Cl.
*H04L 29/06* (2006.01)
*G06F 21/55* (2013.01)
*G06F 21/56* (2013.01)

(52) U.S. Cl.
CPC .............. *G06F 21/55* (2013.01); *G06F 21/554* (2013.01); *G06F 21/56* (2013.01); *G06F 21/566* (2013.01)
USPC ................... 726/24; 726/22; 726/23; 726/25; 713/187; 713/188; 713/193; 713/194

(58) Field of Classification Search
CPC ....................................................... H04L 29/06
USPC ................................ 713/187–188; 726/22–25
See application file for complete search history.

(56) References Cited

U.S. PATENT DOCUMENTS

| 5,526,511 | A | * | 6/1996 | Swenson et al. | 711/134 |
|---|---|---|---|---|---|
| 7,340,777 | B1 | * | 3/2008 | Szor | 726/26 |
| 7,607,173 | B1 | * | 10/2009 | Szor et al. | 726/25 |
| 7,908,640 | B2 | * | 3/2011 | Beresnevichiene et al. | 726/1 |
| 8,099,596 | B1 | | 1/2012 | Rusakov et al. | 713/164 |
| 8,499,354 | B1 | * | 7/2013 | Satish et al. | 726/25 |
| 8,639,991 | B2 | * | 1/2014 | Klein et al. | 714/55 |
| 2004/0098599 | A1 | * | 5/2004 | Bentley | 713/187 |
| 2004/0205474 | A1 | * | 10/2004 | Eskin et al. | 715/500 |
| 2005/0262160 | A1 | * | 11/2005 | Grebenev | 707/201 |
| 2008/0016339 | A1 | * | 1/2008 | Shukla | 713/164 |
| 2008/0016410 | A1 | * | 1/2008 | Pu et al. | 714/47 |

OTHER PUBLICATIONS

Pan, Ming-chieh, et al., "Weapons of Targeted Attack—Modem Document Exploit Techniques", Black Hat USA, 2011, 18 pgs.

* cited by examiner

*Primary Examiner* — Josnel Jeudy
(74) *Attorney, Agent, or Firm* — Harrington & Smith

(57) ABSTRACT

A method of foiling a document exploit type attack on a computer, where the attack attempts to extract malware code from within a document stored on the computer. The method includes monitoring the computer in order to detect repeated function calls made by a given process in respect of the same function but different file descriptors; and in the event that such repeated function calls are detected or the number of such repeated function calls exceeds some threshold, terminating the process that initiated the function calls.

15 Claims, 4 Drawing Sheets

FOILING A DOCUMENT EXPLOIT ATTACK

TECHNICAL FIELD

The present invention relates to document exploits, and in particular to the prevention of malicious code embedded in a malicious document being run.

BACKGROUND

The term "malware" is short for malicious software and is used to refer to any software designed to infiltrate or damage a computer system without the owner's informed consent. Malware can include viruses, worms, trojan horses, rootkits, adware, spyware and any other malicious and unwanted software. Many computer devices, such as desktop personal computers (PCs), laptops, personal data assistants (PDAs) and mobile phones can be at risk from malware.

Detecting malware is often challenging, as malware is usually designed to be difficult to detect, often employing technologies that deliberately hide the presence of malware on a system. It is desirable, if possible, to prevent malware being installed onto a computer in the first place, rather than having to detect and remove it once it has been installed. A common method that is used by creators of malware to bypass anti-virus software and firewalls installed on a computer is to embed the malicious executable code into a document such as a PDF, Excel™ or Flash™ file. A vulnerability in the software used to open the document can then be exploited by the attacker, and allow malware to be installed on the computer system. This is known as a "document exploit". In recent years, there have been several vulnerabilities in Adobe Reader™ and Adobe Flash Player™, as well as in Microsoft Office™ software such as Excel™, Word™ and Powerpoint™. For example, a recent trend has been to embed malicious Flash objects within Microsoft Office files as these are easy to deliver as email attachments and are generally mistakenly trusted by recipients who will open them without much concern. By sending the malware embedded in a document, the attacker no longer requires the malware binary to be downloaded, for example from a known malicious server on the internet, and therefore increases the chances of avoiding antivirus and Intrusion Detection System (IDS) security.

Typically, when a user opens a malicious document (i.e. one that has malicious code embedded within) on a computer, this triggers "shellcode" to be executed. Shellcode is a small piece of code that is also embedded in the document. It is executed by the code that exploits a vulnerability in the software used to open the document The shellcode attempts to find the malicious document that has been opened, and once it has been found, the shellcode can extract the embedded malicious data from the document. Once extracted, the malware can be run, and the computer will be infected.

A current method of detecting such malicious documents is to analyse the code that makes up the document. For example, analysis of the code may include searching for known sections of code that are indicative of known malware or known malicious shellcode. However, code analysis has significant limitations, examples of which include the relatively long time taken to carry out the analysis and the high processing resources required to do so. This can degrade the experience of the end user. In addition, malicious code can be obfuscated, making it difficult to detect, and as shellcode is relatively easy to code (when compared to the malware) an extremely large number of shellcode variants can exist, many of which are likely to be unique and never seen before.

SUMMARY

It is an object of the present invention to prevent document exploits occurring on a computer. This can be achieved by hooking and analysing function calls, detecting suspicious behaviour indicative of document exploit activity, and terminating any processes that show suspicious behaviour.

According to a first aspect of the invention there is provided a method of foiling a document exploit type attack on a computer, where the attack attempts to extract malware code from within a document stored on the computer. The method comprises monitoring the computer in order to detect repeated function calls made by a given process in respect of the same function but different file descriptors; and in the event that such repeated function calls are detected or the number of such repeated function calls exceeds some threshold, terminating the process that initiated the function calls.

Embodiments of the present invention may provide an improved method of preventing document exploits before malware has the opportunity to install itself on a computer system. Embodiments of the present invention may also provide improved zero-day protection against document exploits.

The step of monitoring the computer may comprise hooking the function calls at the computer.

The computer may be monitored to detect repeated function calls where the file descriptors are values that increment or decrement in sequence.

The repeated function calls to be detected may be failed function calls.

The computer may be running a Microsoft Windows operating system and said function calls may be GetFileSize function calls.

The computer may be running a Linux operating system and said function calls may be fstat function calls.

The method may further comprise quarantining or deleting the document containing the exploit after the process has been terminated.

According to a second aspect of the invention there is provided a non-transitory computer readable medium storing a computer program which, when run on a computer, causes the computer to monitor itself in order to detect repeated function calls made by a given process in respect of the same function but different file descriptors; and in the event that such repeated function calls are detected or the number of such repeated function calls exceeds some threshold, terminate the process that initiated the function calls.

According to a third aspect of the invention there is provided a computer program product comprising a computer-readable medium bearing computer program code for use with a computer, the computer program code comprising code for monitoring the computer in order to detect repeated function calls made by a given process in respect of the same function but different file descriptors; and the computer program code comprising code for terminating the process that initiated the function calls in the event that such repeated function calls are detected or the number of such repeated function calls exceeds some threshold.

According to a fourth aspect of the invention there is provided a computer system comprising: one or more processors; and one or more computer-readable memories storing computer program code, the one or more processors being configured to execute the computer program code to cause the computer system at least to: monitor itself in order to detect repeated function calls made by a given process in respect of the same function but different file descriptors; and in the event that such repeated function calls are detected or the number of such repeated function calls exceeds some threshold, terminate the process that initiated the function calls.

The repeated function calls to be detected may have file descriptor values that increment or decrement in sequence.

The repeated function calls to be detected may be failed function calls.

The computer system may be running a Microsoft Windows operating system and said function calls may be GetFileSize function calls.

The computer system may be running a Linux operating system and said function calls may be fstat function calls.

The one or more processors may be configured to execute the computer program code to further cause the computer system to quarantine or delete the document containing the exploit after the process has been terminated.

DETAILED DESCRIPTION

As discussed above, during a document exploit attack, when a user opens a malicious document on a computer, shellcode is executed. The shellcode attempts to find the malicious document that has been opened, and once it has been found, the shellcode can extract the embedded malicious data from the document. Once extracted, the malware can be installed and/or run, and the computer will be infected. Also as discussed above, malicious code that is embedded in documents such as PDF or Microsoft Office files can be difficult to detect. Whilst malware that is delivered in this way may be detected and dealt with by antivirus software after it has been installed, it is far more desirable to stop the malware being installed in the first place.

A new method will now be described, with reference to the figures, that can provide an improved way of detecting and preventing malware from being installed onto a computer system via a document exploit.

Considering further the document exploit scenario, the shellcode that is used to "retrieve" the malicious code from the document is run as soon as the document is opened by the user. In order for the malicious code to be extracted from the document, the shellcode needs to read back from the original document. In order to do this, the shellcode needs to obtain the document's "file descriptor". A file descriptor is an abstract indicator that the operating system assigns temporarily to a file when it is open and that can be used for accessing the file. On the Windows™ operating system, this file descriptor is known as a "file handle", but file descriptors are used in all modern operating systems including Mac OSX and Linux.

Figure 1:
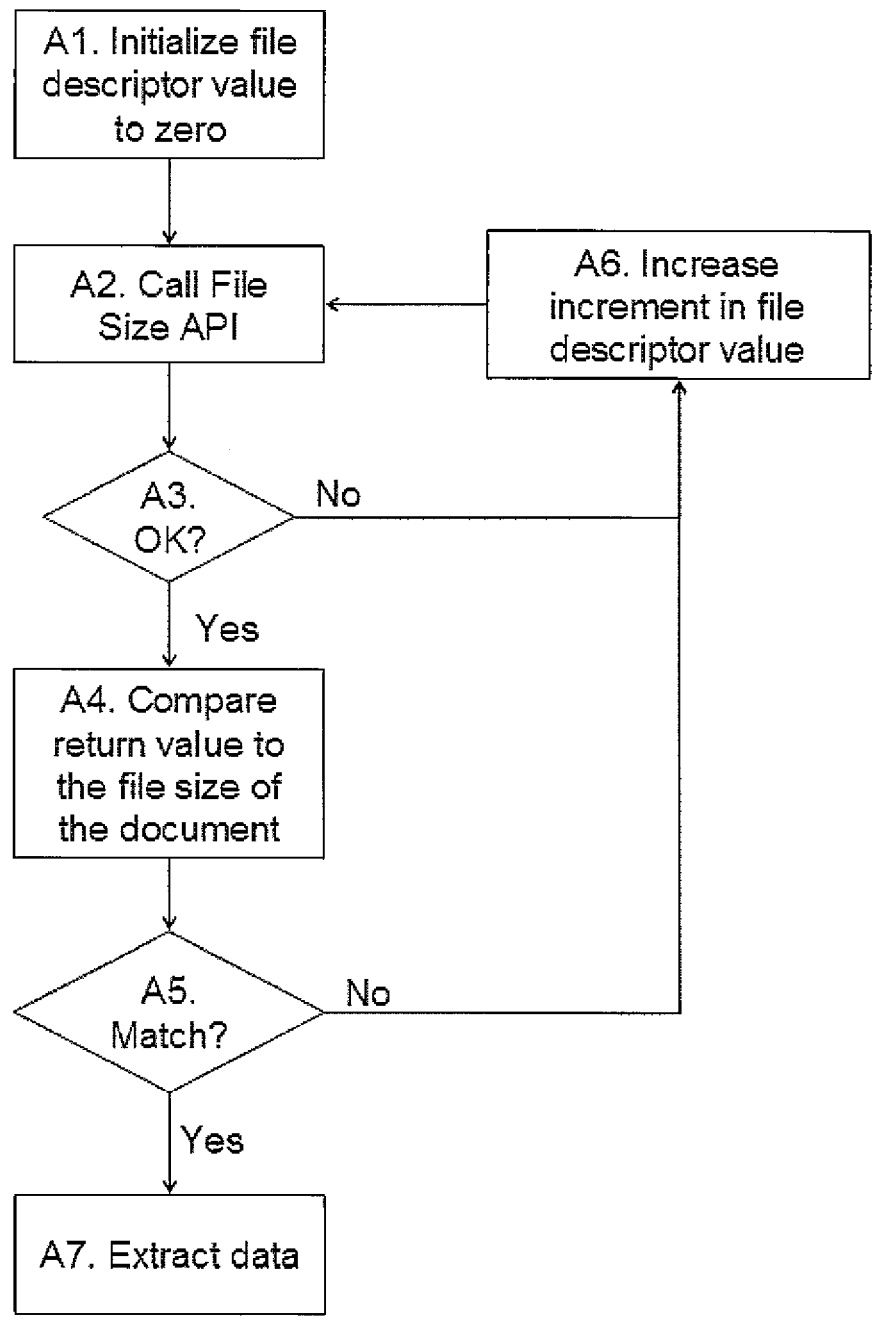
FIG. 1 is a flow diagram outlining a method of brute forcing an API function call.

Almost universally in document exploits, in order to obtain the file descriptor for the document, the shellcode uses a brute-force method, an example of which is illustrated in the flow diagram of FIG. 1.

A1. The file descriptor is initialised using an initial value of zero.

A2. An API function that can obtain the size of a file is called using the file descriptor. For example, on the Windows operating system this will be the GetFileSize API, and on Linux this will be the fstat API.

A3. If the API call determines that there is a file with the file descriptor being used, then the file size of that file is returned and the method continues to step A4. If the API call determines that there is no file known with the file descriptor being used, then no file size can be returned and the method continues to Step A6.

A4. The returned file size value from the API call is compared to the file size of the document that the shellcode is attempting to access.

A5. If the returned API value matches the file size of the document, then it can be deduced that the correct file descriptor has been obtained for that document, and the method continues to Step A7. However, if the returned API value does not match the file size of the document, then it can be deduced that the file descriptor being file descriptor is not correct, and the method will continue with step A6.

A6. The file descriptor value is then increased by a defined increment. And the steps A2 onwards are repeated until a match is found in step A5.

A7. Once a match has been found, and the correct file descriptor has been found, the exploit can be carried out and the malware code extracted from the document.

Monitoring for this behaviour of brute-forcing API function calls can be used to detect and prevent a document exploit from occurring. Code that allows function calls on a computer system to be intercepted is known as a "hook". Hooking will enable the function calls to be monitored and compared to other recent function calls that originated from the same process. Any processes that give rise to a suspicious function call pattern can then be terminated. Harmless code typically uses valid file descriptors, and so would not give rise to this sort of suspicious behaviour.

Figure 2:
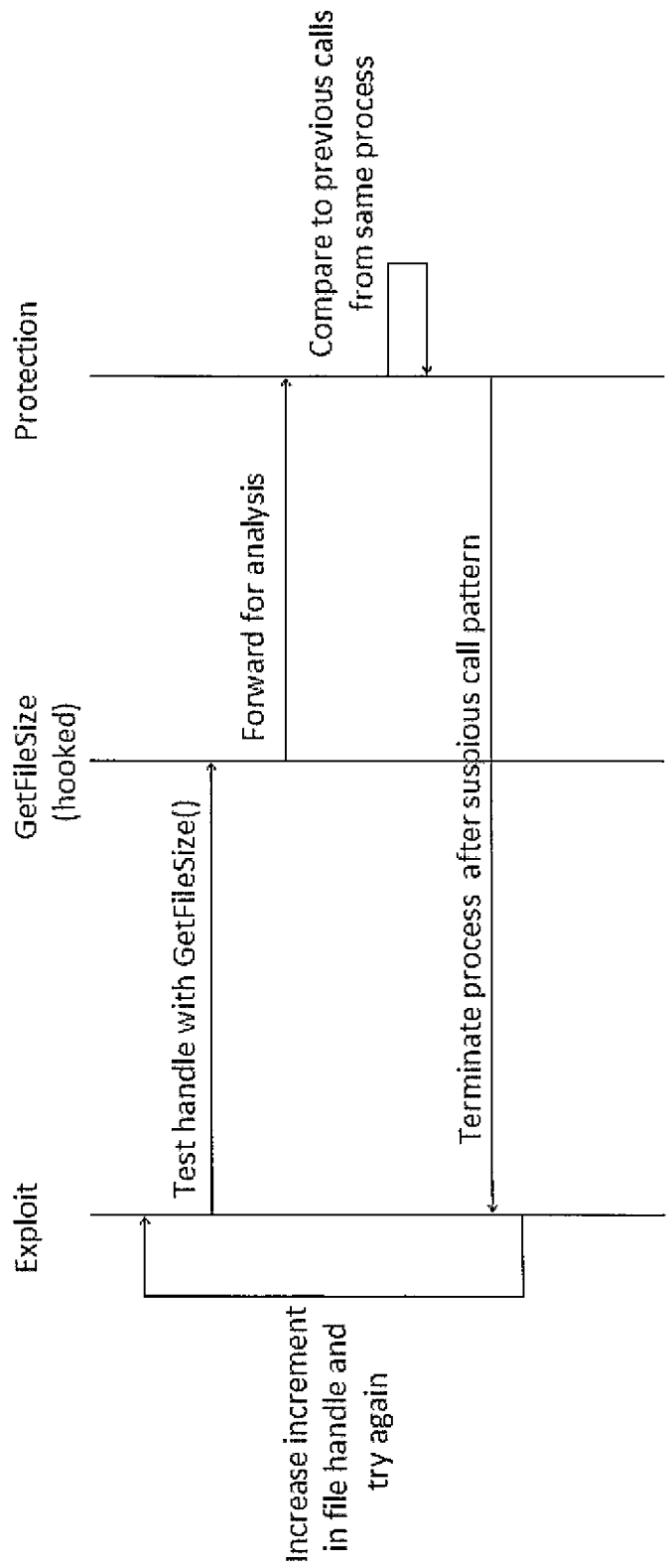
FIG. 2 is a flow diagram illustrating a method of foiling a document exploit attack according to one embodiment for computers running the Windows™ operating system.

FIG. 2 shows an example implementation on the Windows operating system. Each time the exploit tests the file handle with the GetFileSize function call, this information is forwarded for analysis by a protection system. The protection system will typically be antivirus software installed on the computer system. The protection system analyses the function call and compares it to other calls to the same function that have previously been made by the same process. This requires the information captured by the hook to be stored at the protection system. If the function call behaviour appears suspicious, then the protection system may terminate the process that is. Function call behaviour may be determined to be suspicious if, for example, the number of function calls from a given process exceeds a predefined number within a certain period of time. This would be indicative of a brute-force attempt to find a file handle by carrying out the method described above. Suspicious behaviour may be determined according to other parameters, for example the number of failed function calls from a given process within a certain period of time may be considered, and/or whether the file descriptor values used for the function calls form a pattern.

Figure 3:
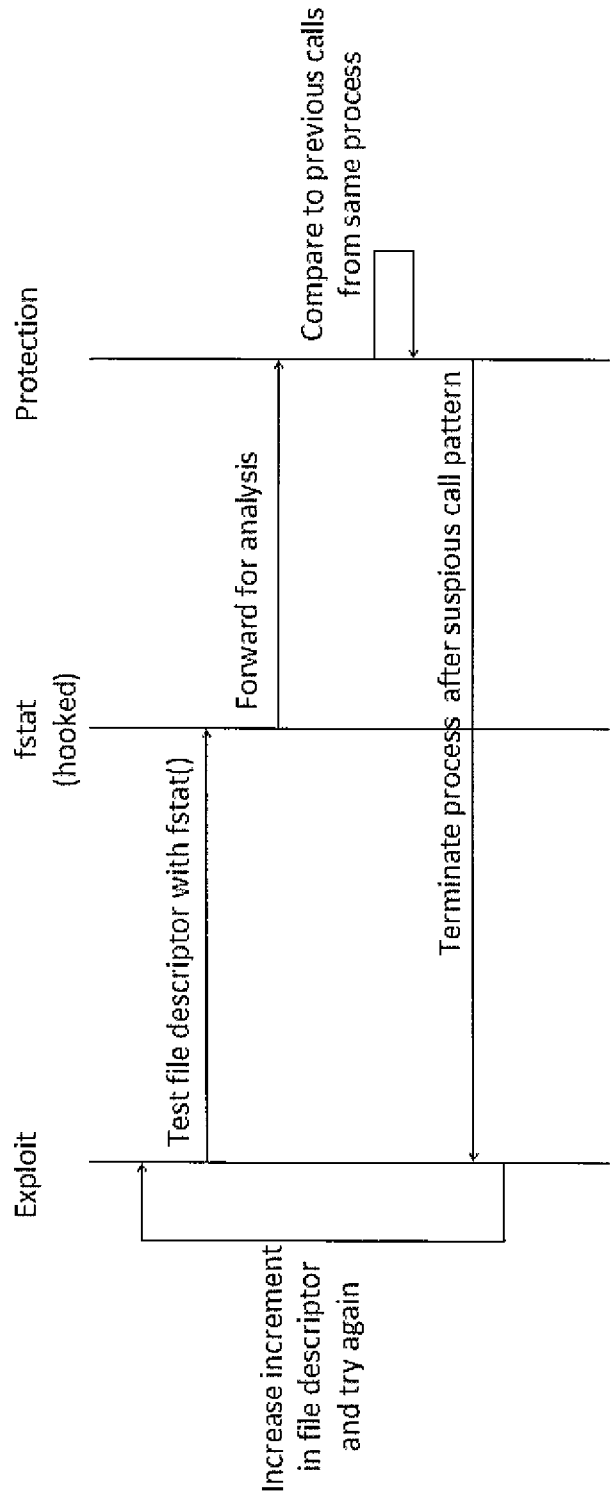
FIG. 3 is a flow diagram illustrating a method of foiling a document exploit attack according to a further embodiment for computers running a Linux™ operating system.

FIG. 3 shows an example implementation on a Linux operating system. FIG. 3 shows that the method is the same as that used in the Windows implementation, except that function calls are made to fstat instead of GetFileSize. Whilst GetFileSize and fstat have been described in the embodiments herein, it will be understood that the same method will be successful in protecting against document exploits that detects for brute-forcing of any suitable API function call.

This method of preventing document exploit detection has several benefits. For example, a large number of document exploits have used file descriptor brute-forcing for a number of years, and it is expected that they will continue to do so, making this an effective method for preventing future document exploits. Furthermore, the method is behaviour orientated and will prevent attacks initiated via document exploits, regardless of the vulnerability that is being exploited. It therefore provides robust protection against "zero-day" exploits. The method can be applied to other APIs that are susceptible to brute-forcing, and can also easily be implemented to provide protection for multiple different programs (e.g. Adobe Read, Word, Excel etc.).

Figure 4:
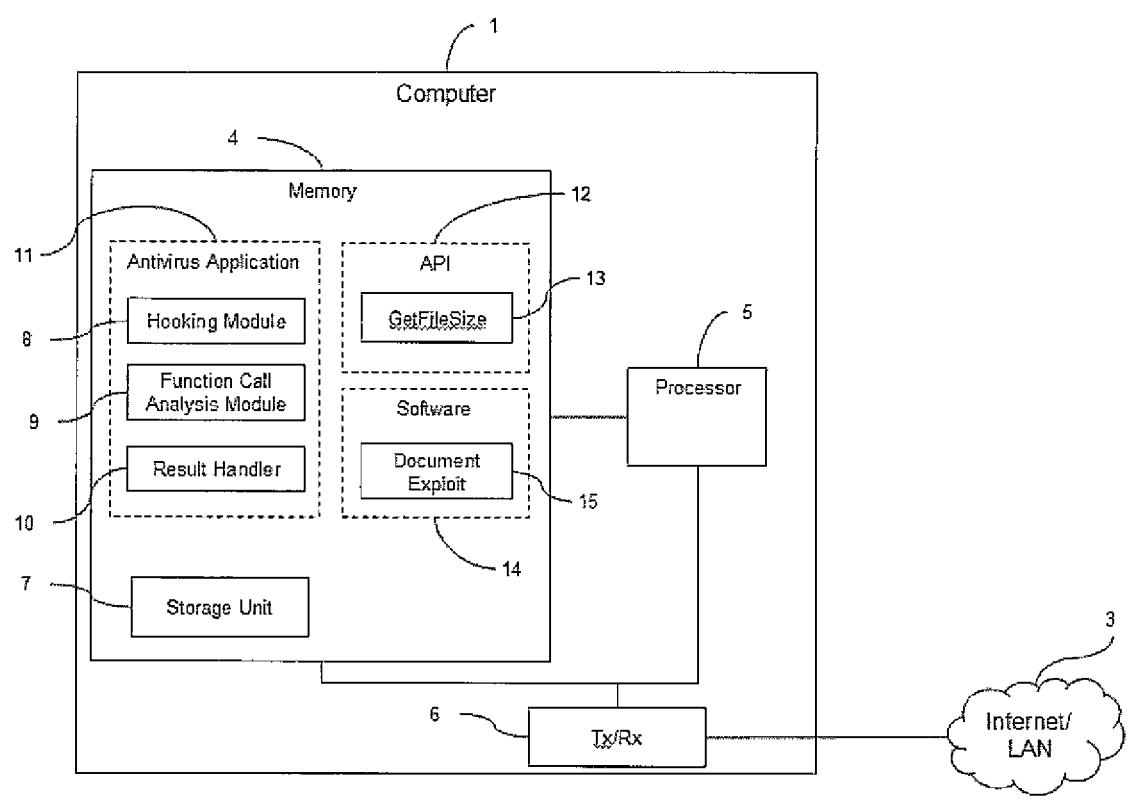
FIG. 4 is a schematic illustration of a computer system according to an embodiment.

FIG. 4 illustrates schematically a computer system comprising a computer 1 connected to a network 3 such as the Internet or a LAN. The computer 1 is implemented as a combination of computer hardware and software. The computer 1 comprises a memory 4, a processor 5 and a transceiver 6. The memory 4 stores the various programs/executable files that are implemented by the processor 5, and also provides a storage unit 7 for any required data. The programs/executable files stored in the memory 4, and implemented by the processor 5, include a hooking module 8, a function call analysis module 9, and a result handler 10, each of which can be sub-units of an antivirus application 11. In addition, the memory 4 stores the Application Programming Interface (API) 12 to which processes can make function calls. FIG. 4 shows the GetFileSize API 13 as an example. The memory 4 can also store other software 14, including software that may contain vulnerabilities that attackers take advantage of to carry out a document exploit 15. The transceiver 6 is used to communicate over the network 3, and can be used to receive the document exploit, for example a PDF document attached to an email. Typically, the computer 1 may be any of a desktop personal computer (PC), laptop, personal data assistant (PDA), mobile phone, or any other suitable device.

The antivirus application 11 uses the hooking module 8 to hook the GetFileSize API 13. The function calls to that API can then be analysed by the function call analysis module 9. When a user of the computer 1 opens a document within software 14 which triggers the document exploit 15 to initiate, the document exploit attempts to brute-force the GetFileSize API in order to obtain the correct file descriptor. This brute-force behaviour is detected as being suspicious by the function call analysis module, and so the result handler 10 terminates the process. The result handler can also engage other aspects of the antivirus application, which can, for example, quarantine or delete the document.

It will be appreciated by the person of skill in the art that various modifications may be made to the above described embodiments without departing from the scope of the present invention.

The invention claimed is:

1. A computer-controlled method, comprising:
using a processor and a computer-readable memory storing computer program code that when executed, foils a document exploit attack that attempts to extract malware code from within a document stored on the compute, by
monitoring the computer in order to detect repeated function calls made by a given process in respect of the same function but different file descriptors; and
in the event that such repeated function calls are detected or the number of such repeated function calls exceeds some threshold, terminating the process that initiated the function calls.

2. A method as claimed in claim 1, wherein the step of monitoring the computer comprises hooking the function calls at the computer.

3. A method as claimed in claim 1, wherein the computer is monitored to detect repeated function calls where the file descriptors are values that increment or decrement in sequence.

4. A method as claimed in claim 1, wherein the repeated function calls to be detected are failed function calls.

5. A method as claimed in claim 1, wherein the computer is running a Microsoft® Windows® operating system and said function calls are GetFileSize function calls.

6. A method as claimed in claim 1, wherein the computer is running a Linux® operating system and said function calls are fstat function calls.

7. A method as claimed in claim 1, wherein the method further comprises quarantining or deleting the document containing the exploit after the process has been terminated.

8. A non-transitory computer readable medium storing a computer program which, when run on a computer, causes the computer to:
use a processor and a computer-readable memory storing computer program code that when executed, foils a document exploit attack that attempts to extract malware code from within a document stored on the computer, by
monitoring itself in order to detect repeated function calls made by a given process in respect of the same function but different file descriptors; and
in the event that such repeated function calls are detected or the number of such repeated function calls exceeds some threshold, terminating the process that initiated the function calls.

9. A computer program product comprising a non-transitory computer-readable storage medium bearing computer program code for use with a computer, the computer program code comprising:
code for monitoring the computer in order to detect repeated function calls made by a given process in respect of the same function but different file descriptors; and
code for terminating the process that initiated the function calls in the event that such repeated function calls are detected or the number of such repeated function calls exceeds some threshold;
wherein a processor and a computer-readable memory storing the computer program code are used such that when the computer program code is executed, a document exploit attack that attempts to extract malware code from within a document stored on the computer is foiled.

10. A computer system comprising:
one or more processors; and
one or more computer-readable memories storing computer program code,
the one or more processors being configured to execute the computer program code to cause the computer system at least to:
use the processor and the computer-readable memory storing computer program code such that when executed, a document exploit attack that attempts to extract malware code from within a document stored on the computer is foiled, by
monitoring itself in order to detect repeated function calls made by a given process in respect of the same function but different file descriptors; and in the event that such repeated function calls are detected or the number of such repeated function calls exceeds some threshold, terminating the process that initiated the function calls.

11. A computer system as claimed in claim 10, wherein the repeated function calls to be detected have file descriptor values that increment or decrement in sequence.

12. A computer system as claimed in claim 10, wherein the repeated function calls to be detected are failed function calls.

13. A computer system as claimed in claim 10, wherein the computer system is running a Microsoft® Windows® operating system and said function calls are GetFileSize function calls.

14. A computer system as claimed in claim 10, wherein the computer system is running a Linux® operating system and said function calls are fstat function calls.

15. A computer system as claimed in claim 10, wherein the one or more processors are configured to execute the computer program code to further cause the computer system to quarantine or delete the document containing the exploit after the process has been terminated.

* * * * *

UNITED STATES PATENT AND TRADEMARK OFFICE
CERTIFICATE OF CORRECTION

| | |
|---|---|
| PATENT NO. | : 8,959,641 B2 |
| APPLICATION NO. | : 13/894471 |
| DATED | : February 17, 2015 |
| INVENTOR(S) | : Timo Hirvonen |

It is certified that error appears in the above-identified patent and that said Letters Patent is hereby corrected as shown below:

In the claims

Claim 1, col. 5, line 60 "compute" should be deleted and --computer-- should be inserted.

Signed and Sealed this
Twelfth Day of May, 2015

Michelle K. Lee
*Director of the United States Patent and Trademark Office*